| GROUP | GROSS SALARY | HEALTH INSURANCE | UNEMPLOYMENT INSURANCE | OLD AGE INSURANCE |
|---|---|---|---|---|
| I | 0 — 659.99 | K4 | K5 | K6 |
| II | 660.00—749.99 | K1 | K5 | K6 |
| III | 750.00—1099.99 | K1 | K2 | K6 |
| IV | OVER 1100.00 | K1 | K2 | K3 |
Fig.1
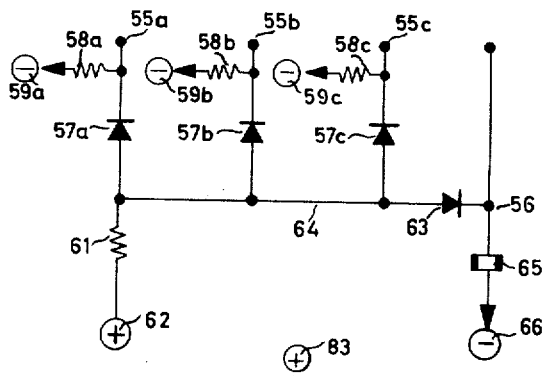
Fig.3
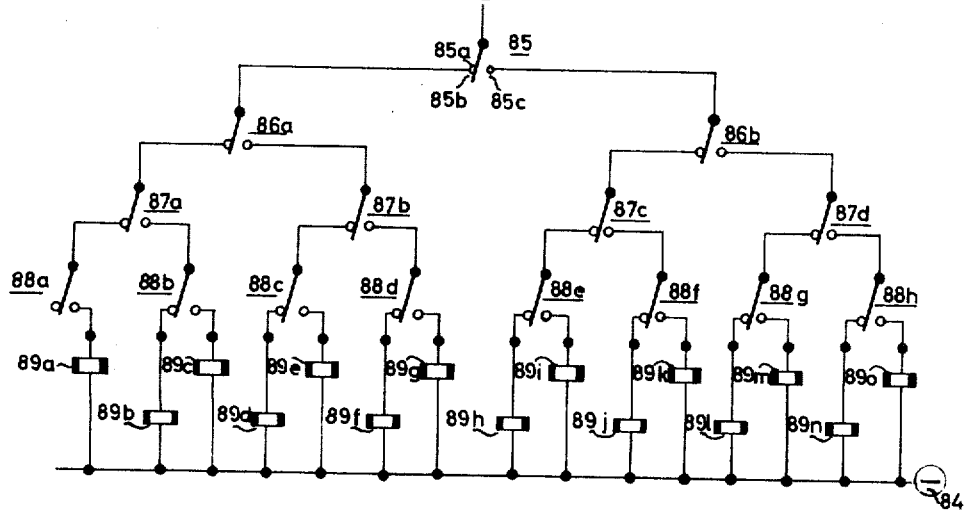
Fig.4

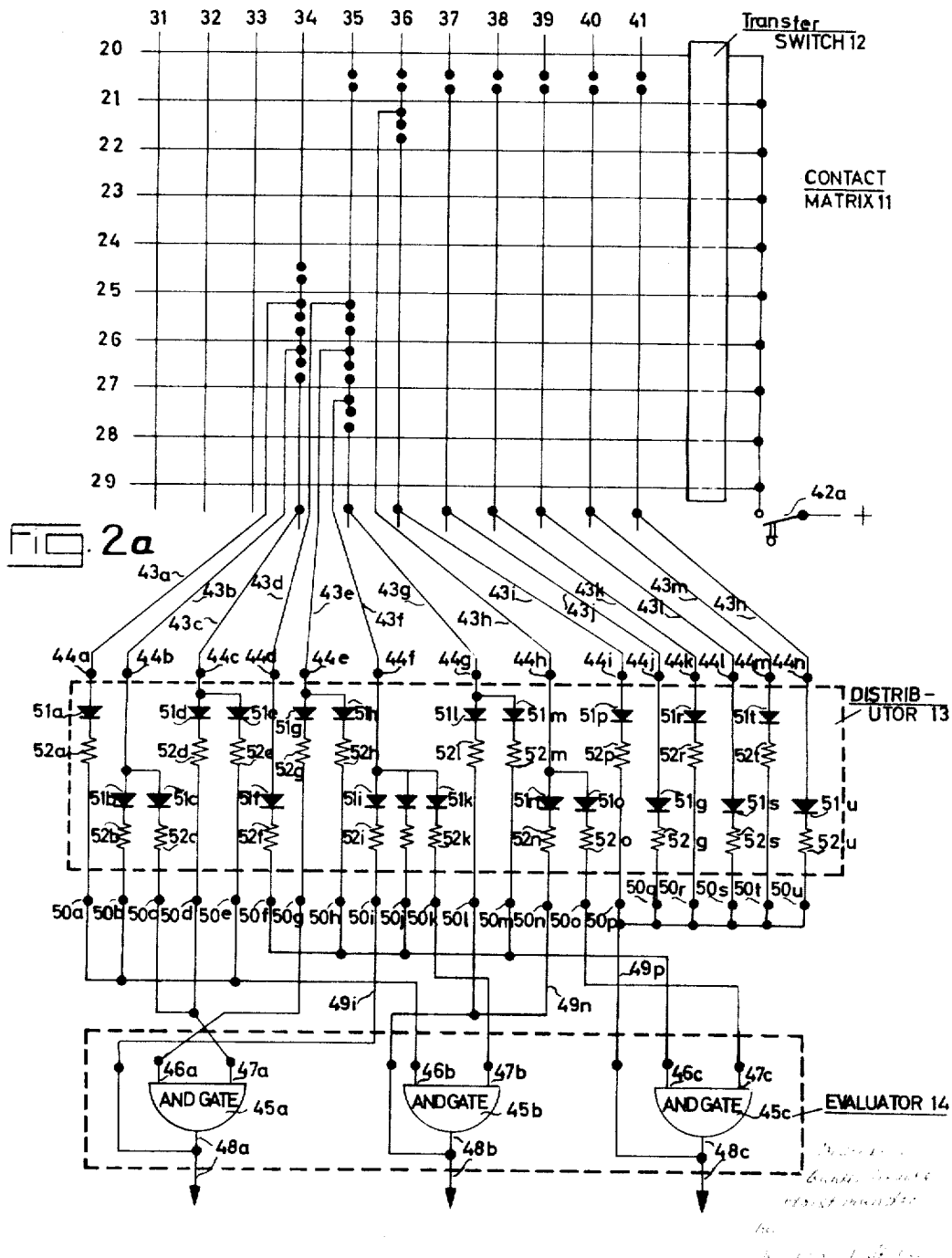

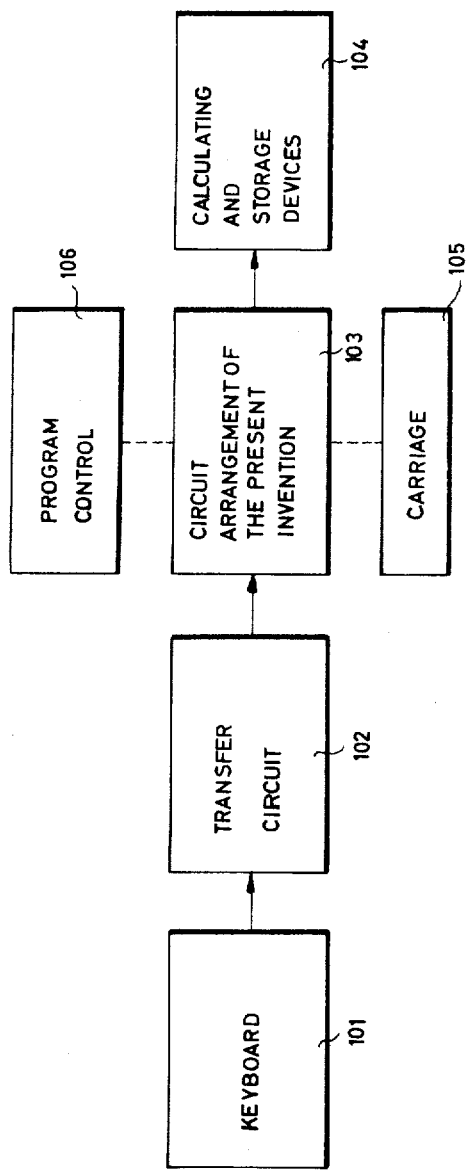

ly, the invention relates to a computer circuit
United States Patent Office 3,363,237
Patented Jan. 9, 1968

3,363,237
COMPUTER IDENTIFICATION CIRCUIT
ARRANGEMENT FOR ACCOUNTING
OPERATION
Gunter Treude, Villingen, and Horst Munster,
Schwenningen, Germany, assignors to Kienzle
Apparate G.m.b.H., Villingen, im Schwartz-
wald, Germany
Filed Sept. 16, 1965, Ser. No. 487,724
Claims priority, application Germany, Sept. 17, 1964,
K 54,025
9 Claims. (Cl. 340—172.5)

The present invention relates to a computer identification circuit arrangement for accounting operation. More particularly, the invention relates to a computer circuit arrangement for magnitude identification in an accounting operation.

During an accounting operation, it is often necessary to excite or energize a selected storage device of a computer or accounting machine to select a magnitude, constant, value or the like for further computer operations such as, for example, variation of a magnitude, value or the like in accordance with such magnitude. Suppose, for example, that the accounting operation concerns salaries and deductions from salaries. Health insurance, unemployment insurance and old age insurance deductions are made monthly from each salary in accordance with the amount or magnitude of the salary. Thus, for example, those earning a salary of $660.00 per month or less may be required to pay a determined percentage of their salary for health insurance, a determined percentage for unemployment insurance and a determined percentage for old age insurance, whereas those earning a salary of $1,100.00 per month or more may be required to pay a determined maximum amount for health insurance, a determined maximum amount for unemployment insurance and a determined maximum amount for old age insurance.

In known computer circuit arrangements for such accounting operations, a contact arrangement is operated through selected selecting members of accounting apparatus. The contact arrangement is so connected at determined points that the corresponding control magnets or magnitude identification magnets of the storage devices are selected for storing the selected magnitude or amount in a storage device in accordance with such selected magnitude or amount. Such a system is not practical or usable in general, because it may be used only if there is no overlapping within the individual decades of the magnitude or amount to be identified. The system may thus be used only if, for example, the magnitude or amount to be identified may be clearly identified by a specific connection of the contact arrangement in a single decade. If the magnitude or amount to be identified is identified by amounts in a plurality of overlapping decades, however, such a system cannot be used.

The principal object of the present invention is to provide a new and improved computer identification circuit arrangement for accounting operation.

An object of the present invention is to provide a circuit arrangement for magnitude identification which selects a storage device or the like regardless of overlapping decades of the amount or magnitude.

In accordance with the present invention, a circuit arrangement is provided with accounting apparatus which includes a keyboard having a selected amount set therein, a contact matrix for identifying a selected magnitude of the selected amount, a transfer device for transferring signals corresponding to the selected amount from the keyboard to the contact matrix, calculating and storage devices for calculating and storing the selected magnitude, a carriage, and a program control. In accordance with the present invention, a plurality of magnitude identification relays corresponding to selected magnitudes actuates selected ones of the calculating and storage devices. A circuit interconnects the magnitude identification relays to permit only one of such relays to be energized at a time. A distributor connected to the contact matrix is connected by a plurality of diode circuit AND gates to the magnitude identification relays for energizing selected ones of the magnitude identification relays directly via the distributor for determined amounts transferred to the contact matrix and for energizing selected ones of the magnitude identification relays via the distributor and the AND gates for determined other amounts transferred to the contact matrix. A plurality of storage device control relays selects the calculating and storage devices and are connected to a carriage positioning arrangement which comprises a plurality of carriage positioning switches connected to the control relays for positioning the carriage. The magnitude identification relays are connected to the carriage positioning switches via a plurality of diode networks. The carriage positioning arrangement comprises a plurality of actuating switches positioned in operative proximity with and actuated by the program control and a plurality of carriage positioning relays connected by a carriage positioning circuit to the carriage positioning switches and the actuating switches for operating the carriage positioning switches. The storage device control relays are connected to a plurality of control relays for providing commands by a plurality of diode networks.

In order that the present invention may be readily carried into effect, it will now be described with reference to the accompanying drawings, wherein:

FIG. 1 is a tubular presentation of the work to be done by the computer circuit arrangement of the present invention;

FIGS. 2a and 2b together form a circuit diagram of an embodiment of the computer circuit arrangement of the present invention;

FIG. 3 is a circuit diagram of an embodiment of an AND gate which may be utilized in the computer circuit arrangement of FIGS. 2a and 2b;

FIG. 4 is a circuit diagram of an embodiment of a carriage positioning arrangement which may be utilized in the computer circuit arrangement of FIGS. 2a and 2b; and FIG. 5 is a block diagram of accounting apparatus including the computer circuit arrangement of the present invention.

Figure 2B:
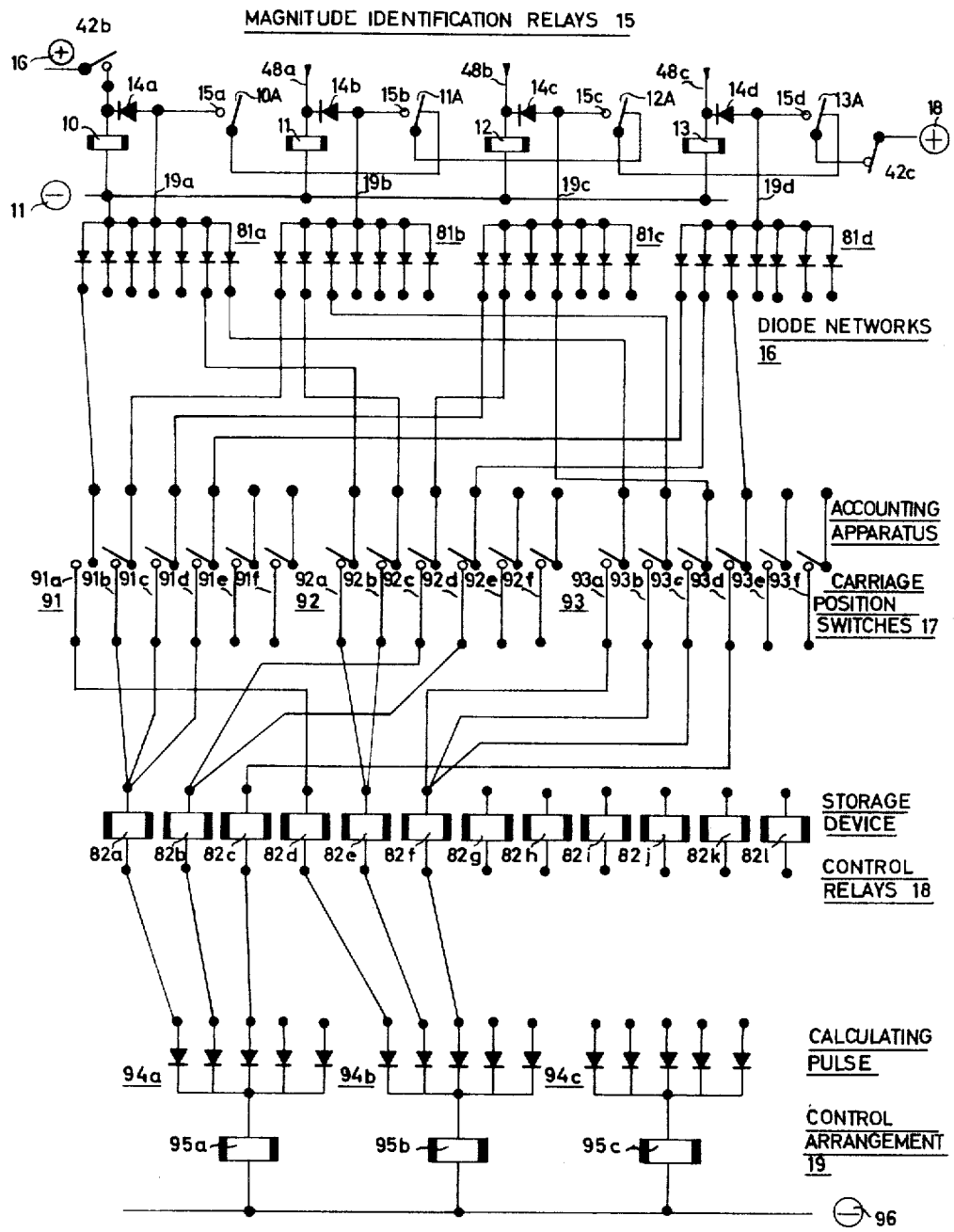

In the tabular presentation of FIG. 1, there are four columns, the first of which, column 1 indicates the gross salary on the basis of which the deductions are to be made. The second column, which is column 2, indicates the health insurance deduction. The third column which is column 3, indicates the unemployment insurance deduction. The fourth column, which is column 4, indicates the old age insurance deduction. Each of the four rows of the table represents a group. In the example illustrated, groups I, II, III and IV are indicated.

The gross salary for group I is 0 to $659.99 per month, that for group II is $660.00 to $749.99 per month, that for group III is $750.00 to $1,099.99 per month, and that for group IV is $1,100.00 and over. In the group I salary range, the health insurance deduction K4 of column 2 is a percentage of the gross salary and must be entered in column 2, row I. The unemployment insurance deduction K5 of column 3 is a percentage of the gross salary and must be entered in column 3, row I. The old age insurance deduction K6 of column 4 is a percentage of the gross salary and must be entered in column 4, row I.

The three percentages K4, K5 and K6 must be accounted for by the computer of the accounting apparatus as the multiplier for the multiplicand, which is the gross salary. The computer identification circuit arrangement must, in the case of group I or a gross salary of up to $659.99 per month, select the constants or percentages K4, K5 and K6 in the columns 2, 3 and 4 of row I in dependence upon the position of the carriage of the accounting apparatus, and must also issue a command that the constants K4, K5 and K6 be utilized as multipliers.

A similar situation exists with regard to the other magnitudes to be identified. In the group II salary range, the health insurance deduction K1 of column 2 is a maximum deduction from the gross salary and must be entered in column 2, row II. The maximum deduction K1 must be accounted for by the computer of the accounting apparatus as the subtrahend for the minuend, which is the gross salary. The unemployment insurance deduction and the old age insurance deduction for group II are the same as for group II and must be entered as K5 and K6, respectively, in column 3, row II and column 4, row II, respectively.

In group III salary range, the health insurance deduction K1 is the same as for group II and must be entered as K1 in column 2, row III. The unemployment insurance deduction K2 of column 3 is a maximum deduction from the gross salary and must be entered in column 3, row III. The maximum deduction K2 must be accounted for by the computer of the accounting apparatus as the subtrahend for the minuend, which is the gross salary. The old age insurance deduction for group III is the same as for groups I and II and must be entered as K6 in column 4, row III.

In the group IV salary range, the health insurance deduction and the unemployment insurance deduction are the same as for group III and must be entered as K1 and K2, respectively in column 2, row IV and column 3, row IV, respectively. The old age insurance deduction K3 of column 4 is a maximum deduction from the gross salary and must be entered in column 4, row IV. The maximum deduction K3 must be accounted for by the computer of the accounting apparatus as the subtrahend for the minuend, which is the gross salary.

The constand or percentages K4, K5 and K6 are thus multipliers for the gross salary which is the multiplicand, and the product is then subtracted from the gross salary, the gross salary then being the minuend and the product of the previous multiplication being the subtrahend. The difference is then the salary balance due after the deduction. The constants or maximum deductions K1, K2 and K3 are thus subtrahends for the gross salary which is the minuend, and the difference is then the salary balance due after the deduction.

The example illustrated in FIG. 1 is for the purpose of illustration only, and is but one of a plurality of possibilities, all of which are readily utilized by the computer identification circuit arrangement of the present invention.

FIGS. 2a and 2b together are a circuit diagram of an embodiment of the computer circuit arrangement of the present invention. The computer circuit arrangement of FIGS. 2a and 2b provide and controls the magnitude identification and subsequently the calculation of the constants. The circuit arrangement of FIGS. 2a, 2b comprises a contact field or matrix 11, a transfer switch 12, a distributor 13, an evaluator 14 (all shown in FIG. 2a), magnitude identification relays 15, diode networks 16, accounting apparatus carriage positioning switches 17, storage device control relays 18 and a calculating pulse control arragement 19 (shown in FIG. 2b).

The contact field or matrix 11 comprises a plurality of conductors 20 and 29 which may be positioned in rows and a plurality of conductors 31 and 41 which may be positioned in columns. The rows of conductors and the columns of conductors are electrically connected with each other at determined points when the differential actuating members of the accounting apparatus execute an operation cycle and thereby advance to an amount set on a keyboard of the apparatus.

The transfer switch 12 functions to switch the contact matrix 11 for purposes of magnitude identification briefly from the calculating portion of the accounting apparatus to the magnitude identification circuit arrangement of the present invention. The switching operation of the transfer switch 12 is controlled by a cam-operated switch of contact 42a which is closed during a determined portion of an operation cycle. As soon as the contact 42a is closed, the contact matrix 11 is switched to the distributor 13 via the transfer switch 12.

The columns of conductors 31 to 41 of the contact matrix 11 represent decades or tens. Thus, the conductor 31 represents the first decade, the conductor 32 represents the second decade, the conductor 33 represents the third decade, and so on. To enable magnitude identification, the decade conductors 31 to 41 are interrupted at selected points. Thus, for example, the decade conductor 34, which represents the fourth decade, is interrupted between the row conductors 24 and 25, between the row conductors 25 and 26 and between the row conductors 26 and 27. The rows of conductors 20 and 29 of the contact matrix 11 represent units, one or digits.

Three electrical conductors 43a, 43b and 43c are connected to the decade conductors 34. The conductors 43a and 43b are connected to inputs 44a and 44b, respectively, of the distributor 13. The decade conductor 34 at the $10 position, is interrupted between the ones conductors 24 and 25 because the distinction between the magnitude of gross salary for group II and the magnitude of gross salary for group III, as shown in column 1 of FIG. 1, rows II and III, is at $750.00, so that the distinction lies between $749. and $750. or between the fourth decade and the fifth decade and the ninth and tenth units. The decade conductor 34 is interrupted between the ones conductors 25 and 26 because the distinction between the magnitude of gross salary for group I and the magnitude of gross salary for group II, as shown in column 1 of FIG. 1, rows I and II, is at $660.00, so that the distinction lies between $659. and $660. or between the fifth decades and the sixth decade and the ninth and tenth units.

The decade conductor 35, at the $100. position, is interrupted between the ones conductors 20 and 21, 25 and 26, 26 and 27 and 27 and 28. The decade conductor 35, at the $100. position, is interrupted between the ones conductors 20 and 21 because the distinction between the magnitude of gross salary for group III and the magnitude of gross salary for group IV, as shown in column 1 of FIG. 1, rows III and IV, is at $1,100., so that the distinction lies between $1,099. and $1,100. or between the zero hundred and the first hundred, the ninth and tenth decades and the ninth and tenth units. Four electrical conductors 43d, 43e, 43f and 43g are connected to the decade conductor 35. The conductors 43d, 43e and 43f are connected to inputs 44d, 44e and 44f, respectively, of the distributor 13.

The decade conductor 36, at the $1,000. position is interrupted between the ones conductors 20 and 21 and 21 and 22. An electrical conductor 43h is connected between the interruptions in the decade conductor 36 and an input 44h of the distributor 13. Each of the decade conductors 37, 38, 39, 40 and 41 is interrupted between the ones conductors 20 and 21. An electrical conductor is connected from each of the decade conductors 37 to 41 to a corresponding input of the distributor 13. Thus decade conductors 37, 38, 39, 40 and 41 respectively, are connected by electrical conductors 43j, 43k, 43l, 43m and 43n, respectively, to inputs 44j, 44k, 44l, 44m and 44n, respectively, of the distributor 13. The decade conductor 34 is connected to input 44c of the distributor 13 by an electrical conductor 43c. The decade conductor 35 is connected to input 44g of the distributor 13 by an electrical conductor 43g. The decade conductor 36 is connected to input 44i of the distributor 13 by an electrical conductor 43i.

The distributor 13 functions to distribute signals or pulse supplied to its input 44a to 44n to the evaluator 14 in accordance with the magnitude to be identified. The evaluator 14 comprises a plurality of AND gates 45a, 45b and 45c. Each of the AND gates has two inputs and an output; the AND gate 45a having inputs 46a and 47a and an output 48a, the AND gate 45b having inputs 46b and 47b and an output 48b and the AND gate 45c having inputs 46c and 47c and an output 48c. An electrical conductor is connected in parallel with each of the AND gates 45a, 45b and 45c between the output of the AND gate and the distributor 13. Thus, an electrical conductor 49i is connected from output 50i of the distributor 13 to the output 48a of the AND gate 45a, an electrical conductor 49n is connected from output 50n of the distributor 13 to the output 48b of the AND gate 45b, and an electrical conductor 49p is connected from output 50p of the distributor 13 to the output 48c of the AND gate 45c.

Some of the inputs 44a to 44n of the distributor 13 are connected to a single output of the outputs 50a to 50u, others of said inputs are connected to two or three of said outputs, and pluralities of said outputs are connected together. Each conductor passing through the distributor 13 includes a diode and a resistor connected in a series therein, between the input and the output. Thus, the input 44a of the distributor 13 is connected to a single output 50a of said distributor via the series connection of diode 51a and resistor 52a. The output 50a is connected together with outputs 50b and 50e and the common connection is connected to the input 46b of the AND gate 45b.

Signals supplied to the input 44f of the distributor 13 are fed to three outputs 50i, 50j, and 50k thereof via the series connections of diodes and resistors 51i, 52i and 51j, 52j and 51k, 52k, respectively. Signals supplied to the inputs 44b, 44c, 44e, 44g and 44h of the distributor 13 are each fed to two outputs 50b and 50c, 50d and 50e, 50g and 50h, 50l and 50m and 50n and 50o, respectively, through the corresponding series connections of diodes and resistors 51b, 52b and 51c, 52c, 51d, 52d and 51e, 52e, 51g, 52g and 51h, 52h, 51l, 52l and 51m, 52m, and 51n, 52n and 51o, 52o, respectively.

Signals supplied to the inputs 44i to 44n of the distributor 13 are absolutely unambiguous value readouts from the contact matrix 11 and may thus be supplied directly to the magnitude identification relays 15. Thus signals supplied to inputs 44i, 44j, 44k, 44l, 44m and 44n are fed to outputs 50p, 50q, 50r, 50s, 50t and 50u, respectively, which outputs are connected in common to the output 48c of the AND gate 45c. A magnitude amount, value, sum or the like provided in the sixth decade conductor 36 of the contact matrix 11, which is in the $1,000. or thousands position, may be, for example, 2, 9. The magnitude is thus $2,000. or more, in any case, so that there is a clean, unambiguous readout which must energize or actuate the magnitude identification relay for the group IV, which is for magnitudes greater than $1,100.

When the readout value is ambiguous, operation of the distributor 13 is different from when such value is unambiguous. Thus, if the magnitude is $780., for example, the digit 8 in the fourth decade conductor 34, which is in the $10. or tens position, is ambiguous because it could possibly belong in any of groups I, II, III and IV. Thus, a signal from the decade conductor 34 may be fed via the distributor 13 to the input 47a of the AND gate 45a and/or to the input 46b of the AND gate 45b, such signal corresponding to magnitudes in groups II and III, respectively. If the signal were to correspond to a magnitude belonging in group IV, an additional pulse would be supplied to the output 48c of the AND gate 45c via one of the inputs 44i to 44n of the distributor 13. For the example of $780,– conductors 34 and 28 would be connected, procuring a pulse at input 44c passed by distributor 13 to input 47a of AND gate 45a and input 46b of AND gate 45b.

For the example of a magnitude of $780,– the digit 7 in the fifth decade conductor 35, which is the $100,– or hundreds position, is ambiguous because it could possibly belong in any of groups II, III and IV. Thus for the digit 7 conductors 35 and 27 are connected and a signal is supplied to input 44f and fed via the distributor 13 to the input 46c of the AND gate 45c and to the input 47b of the AND gate 45b from the outputs 50j, and 50k, respectively, and to the output 48a of the AND gate 45a via the output 50i of said distributor. Thus, in the case of the magnitude $780,– each of the AND gates 45a and 45c is fed a signal at only one of its inputs and both inputs of the AND gate 45b are fed signals. Thus, the AND gate 45b is switched to its conductive condition.

Each of the AND gates 45a, 45b and 45c may comprise any suitable known circuit arrangement. An AND gate which may be utilized in the computer circuit arrangement as the AND gate 45a, 45b or 45c is shown in FIG. 3, which is a diode circuit arrangement. The number of inputs of the AND gate depends upon the magnitudes, amounts or the like which are to be identified. That is, the number of inputs of the AND gate depends upon how many decades the magnitude to be identified is to be absolutely determined in. For each decade in which the magnitude to be identified is to be absolutely determined, an input should be provided for the AND gate. In many cases, two inputs to the AND gate are sufficient, as in the circuit arrangement of FIGS. 2a, 2b. Three or more inputs may be provided for the AND gate, however.

In FIG. 3, the AND gate has three inputs 55a, 55b and 55c, respectively, and one output 56. The inputs of the AND gate would be connected to the outputs of the distributor 13. A diode 57a is connected to the input 55a, a diode 57b is connected to the input 55b and a diode 57c is connected to the input 55c. A resistor 58a is connected between a source 59a of negative potential and a common point in the connection between the input 55a and the diode 57a. A resistor 58b is connected between a source 59b of negative potential and a common point in the connection between the input 55b and the diode 57b. A resistor 58c is connected between a source 59c of negative potential and a common point in the connection between the input 55c and the diode 57c.

The cathode of each of the diodes 57a, 57b and 57b is connected to the corresponding one of the inputs 55a, 55b and 55c. A resistor 61 is connected between the anode of the diode 57a and a source 62 of positive potential, in series connection with said diode. A diode 63 is connected between the output 56 and a common point in the connection between the diode 57a and the resistor 61, with its anode connected to said common point and its cathode connected to said output. The diodes 57a, 57b and 57c are connected in parallel with each other, the anode of each being connected to a common line 64 connecting the diode 63 with the common point of the connection between the diode 57a and the resistor 61.

If there is no signal at any of the inputs 55a, 55b and 55c, a current flows from the positive potential source 62, via the resistor 61 and the parallel circuits 57a, 58a and 57b, 58b, and 57c, 58c, to the negative potential sources 59a, 59b and 59c, respectively. A current also flows from the positive potential source 62, via the resistor 61 and the diode 63, to the output 56 and a relay 65, which corresponds to one of the magnitude identification relays 15 of FIG. 2b, and a source 66 of negative potential. The current flowing through the relay 65 is of such low magnitude, due to the several branches through which current flows, that said relay remains unenergized.

Even if a positive signal is supplied to one or two of the inputs 55a, 55b and 55c and thereby blocks the corresponding diode or diodes, the magnitude of the current flowing through the relay 65 is insufficient to energize said relay. The relay 65 is energized only if a signal is supplied to all the inputs 55a, 55b and 55c simultaneously, and thereby blocks all the diodes 57a, 57b and 57c.

The output 48a of the AND gate 45a is connected to a relay 71 of the magnitude identification relays 15, the output 48b of the AND gate 45b is connected to a relay 72 of said relays and the output 48c of the AND gate 45c is connected to a relay 73 of said relays. A relay 70 is included with the relays 71, 72 and 73 in the magnitude identification relays 15. A diode 74a is connected in series with a contact 75a of an armature 70A which is controlled by the relay 70. A diode 74b is connected in series with a contact 75b of an armature 71A which is controlled by the relay 71. A diode 74c is connected in series with a contact 75c of an armature 72A which is controlled by the relay 72. A diode 74d is connected in series with a contact 75d of an armature 73A which is controlled by the relay 73.

The relays 70, 71, 72 and 73 correspond to the different magnitudes or amounts of the groups I, II, III and IV. Thus, the relay 70 corresponds to the magnitude 0 to $659.99, the relay 71 corresponds to the magnitude $660.00 to $749.99, the relay 72 corresponds to the magnitude $750.00 to $1,099.99, and the relay 73 corresponds to the magnitude $1,100.00 and more. Each of the relays 70, 71, 72 and 73 is initially deenergized by its armature 70A, 71A, 72A and 73A, respectively. A switch 42b, which is mechanically coupled with the switch 42a of the contact matrix 11, connects the relay 70 to a source 76 of positive potential.

If none of the AND gates 45a, 45b and 45c of the evaluator 14 is in its conductive condition and none of the outputs 48a, 48b and 48c of said AND gates is supplied a signal from the distributor 13, so that there is no signal in any of the inputs 48a, 48b and 48c of the magnitude identification relays 15, the relay 70 is energized via the positive potential source 76 and a source 77 of negative potential when the switch 42b is closed. When the relay 70 is energized, the armature 70A makes electrical contact with the contact 75a and thereby closes a self-holding circuit 77, 70, 74a, 75a, 70A, 71A, 72A, 73A, 42c to a source 78 of positive potential. The switch 42c is connected between the armature 73A and the positive potential source 78 and functions as a deenergizing switch. The energization of the relay 70 of the magnitude identification relays 15 indicates a magnitude of group I.

When a signal is supplied to one of the inputs 48a, 48b and 48c of the magnitude identification relays 15, the corresponding one of the relays 71, 72 and 73 respectively, is energized and moves its associated armature 71A, 72A or 73A, respectively, into electrical contacting position with the contact 75b, 75c or 75d, respectively, thereof. The series circuit connection of the armatures 70A, 71A, 72A and 73A insures that only that relay which is associated with the higher magnitude is connected into its self-holding circuit. If, for example, the relays 71 and 73 are simultaneously energized by signals in the inputs 48a and 48c, so that both armatures 71A and 73A are switched into electrical contact with their corresponding contacts 75b and 75d, respectively, the relay 71 will be deenergized upon termination of the signal supplied to the input 48a, whereas the relay 73 will remain energized after termination of the signal supplied to the input 48c. This is due to the opening of the self-holding circuit of the relay 71 by the armature 73A in its contacting position with the contact 75d, whereas such position of said armature closes the self-holding circuit of the relay 73.

The switch 42c is controlled by a cam and functions to deenergize all the relays 70, 71, 72 and 73 of the magnitude identification relays 15 upon termination of the magnitude identification operation such as, for example, upon the reaching of its end position by the carriage of the accounting apparatus.

The diode networks 16 are connected to the magnitude identification relays 15 via a plurality of electrical conductors 79a, 79b, 79c and 79d. The electrical conductor 79a is connected between a common point in the connection between the diode 74a and the contact 75a and a diode network 81a. The electrical conductor 79b is connected between a common point in the connection between the diode 74b and the contact 75b and a diode network 81b. The electrical conductor 79c is connected between a common point in the connection between the diode 74c and the contact 75c and a diode network 81c. The electrical conductor 79d is connected between a common point in the connection between the diode 74d and the contact 75d and a diode network 81d.

Each of the diode networks 81a, 81b, 81c and 81d comprises seven diodes which all receive a single input but which are connected at their outputs to different ones of the switches 17 operated in accordance with the accounting apparatus carriage position, so that they transfer commands to the accounting apparatus and for storage in dependence upon the magnitude, amount or the like involved and in dependence of a certain carriage position. The number of diodes in each diode network is determined by the number of commands required.

The outputs of selected ones of the diodes of each of the diode networks 81a, 81b, 81c and 81d of the diode networks 16 are connected to selected ones of a plurality of storage device control relays 82a to 82l of the storage device control relays 18 through the accounting apparatus carriage position switches 17. The storage device control relays 82a to 82l function to select specific constant storage devices (not shown) calculating devices (not shown) or storage devices (not shown).

The accounting apparatus carriage position switches 17 are controlled by the carriage positioning arrangement of FIG. 4. The carriage positioning arrangement of FIG. 4 comprises a plurality of switches and a plurality of relays connected between a source 83 of positive potential and a source 84 of negative potential. The switches control the energization of the relays. The switches are connected in a somewhat pyramidal fashion, each switch except the first having an armature connected to a contact of the next preceding switch, and two spaced contacts, each connected to the armature of the next succeeding switch.

A first switch 85 has an armature 85a connected to the source 83 of positive potential and is moved to electrically contact either of its spaced contacts 85b and 85c. Each contact of the switch 85 is connected to the armature of a next succeeding switch and so on, so that two switches are connected to the first switch, four switches are connected to the two switches and eight switches are connected to the four switches. Thus, the armature of a switch 86a is connected to a contact 85b of the switch 85 and the armature of a switch 86b is connected to a contact 85c of the switch 85. The armature of a switch 87a is connected to one contact of the switch 86a and the armature of a switch 87b is connected to the other contact of the switch 86a. The armature of a switch 87c is connected to one contact of the switch 86b and the armature of a switch 87d is connected to the other contact of the switch 86b. In the same manner, the armature of switches 88a and 88b are connected to the contacts of the switch 87a, the armatures of switches 88c and 88d are connected to the contacts of the switch 87b, the armatures of switches 88e and 88f are connected to the contacts of the switch 87c, and the armatures of switches 88g and 88h are connected to the contacts of the switch 87d.

A carriage positioning relay 89a is connected to one contact of the switch 88a, the other contact of said switch being disconnected. One contact of the switch 88b is connected to a carriage positioning relay 89b and the other contact of said switch is connected to a carriage positioning relay 89c. One contact of the switch 88c is connected to a carriage positioning relay 89d and the other contact of said switch is connected to a carriage positioning relay 89e. One contact of the switch 88d is connected to a carriage positioning relay 89f and the other contact of said switch is connected to a carriage positioning relay 89g.

One contact of the switch 88e is connected to a carriage positioning relay 89h and the other contact of said switch is connected to a carriage positioning relay 89i. One contact of the switch 88f is connected to a carriage positioning relay 89j and the other contact of said switch is connected to a carriage positioning relay 89k. One contact of the switch 88g is connected to a carriage positioning relay 89l and the other contact of said switch is connected to a carriage positioning relay 89m. One contact of the switch 88h is connected to a carriage positioning relay 89n and the other contact of said switch is connected to a carriage positioning relay 89o. Each of the relays 89a to 89o is connected to the source 84 of negative potential.

The program for the accounting apparatus such as, for example, the mechanical control bridge thereof, provides for the control of the switches 85, 86a and 86b, 87a, 87b, 87c, and 87d, and 88a, 88b, 88c, 88d, 88e, 88f, 88g and 88h. A control stop or other suitable actuating mechanism in a first row of the mechanical control bridge (not shown) of the accounting apparatus controls the movement only of the armature of the switch 85. Another control stop or other suitable actuating mechanism in a second row of the mechanical control bridge controls the movement only of the armatures of the switches 86a and 86b. Another control stop or other suitable actuating mechanism in a third row of the mechanical control bridge controls the movement only of the armatures of the switches 87a, 87b, 87c and 87d. Still another control stop or other suitable actuating mechanism in a fourth row of the mechanical control bridge controls the movement only of the armatures of the switches 88a to 88h.

The positioning or setting of the control stops or other suitable actuating mechanisms of the mechanical control bridge of the accounting apparatus thus may be utilized to selectively energize the carriage position relays 89a to 89o in a manner such that each of said carriage position relays corresponds to a specified carriage position after the switches 85, 86, 87 and 88 have passed through operative proximity with the mechanical control bridge of the accounting apparatus. Thus, if the gross salary or magnitude identification column (FIG. 1) corresponds, for example, to the carriage position in which the carriage position relay 89a is to be energized, it is only necessary to position or set the control stop or other suitable actuating mechanism in the corresponding row of the mechanical control bridge. The remaining switches 85, 86 and 87 remain in their positions shown in FIG. 4, so that the armature of the switch 88a is moved to its position other than that shown in FIG. 4 and the carriage position relay 89a is energized via the source 83 of positive potential, the switch 85, the switch 86a, the switch 87a, the switch 88a, said carriage position relay and the source 84 of negative potential.

Any desired arrangement of switches may be provided for each of the carriage position relays to be controlled by said carriage position relays. Such an arrangement of switches may comprise, for example, the carriage position switches 17 of FIG. 2b. The carriage position switches 17 thus represent the carriage position in the circuit.

The carriage position switches may be provided in three groups of six switches each, for example. A first group of carriage position switches 91 may be associated with the carriage position representing the column 2 for FIG. 1, for example. A second group of carriage position switches 92 may be associated with the carriage position representing the column 3 of FIG. 1, for example. A third group of carriage position switches 93 may be associated with the carriage position representing the columns 2, 3 and 4 have been reached, than, in accordance with the identified magnitude, amount or the like of column 1 of FIG. 1, the desired deductions K1, K2, K3, K4, K5 or K6 are selected by the circuit arrangement of the carriage position switches 17.

The storage device control relays 82a to 82l are connected between the carriage position switches 17 and the calculating pulse control arrangement 19. The calculating pulse control arrangement 19 comprises a plurality of diode networks 94a, 94b and 94c. Each of the diode networks 94a, 94b and 94c comprises five diodes which each receive a separate input but which are all connected to a common output. The outputs of the diode networks 94a, 94b and 94c are connected to corresponding ones of control relays 95a, 95b and 95c.

The control relay 95b may provide for example, a command to calculate the deductions K4, K5 and K6 for the amounts shown in the magnitude identification column, or carriage position 1. In this case, a specific percentage, as hereinbefore described, must be determined from the gross salary and must be deducted from such salary. The control relay 95a may provide, for example, a command to deduct the amounts K1, K2 or K3 from the gross salary, indicated in the magnitude identification column 1 of FIG. 1. The control relay 95c may function to transmit any command. Thus, for example, the control relay 95c may provide a command that no calculation or deduction is to be made.

If it is assumed that the carriage of the accounting apparatus is in the carriage position 1, which corresponds to the magnitude identification column, the magnitude, amount or the like $660.00 is set in the keyboard and is transferred to the contact matrix 11 by the start of operation of the accounting apparatus. The contact field is transferred via the cam-operated switches 42a and 42b and the transferred switch 12. Since the magnitude is $660.00, the points of contact between the conductor 35 and 26 and between the conductor 34 and 26 of the contact matrix 11 are closed.

In the case of the present example, the conductor 43e and the conductor 43b each transmit a signal or pulse to the corresponding inputs 44e and 44b of the distributor 13. The distributor 13 transmits the signal from the input 44e to the input 46a of the AND gate 45a of the evaluator 14 and to the input 46c of the AND gate 45c and from the input 44b to the input 46b of the AND gate 45b and to the input 47a of the AND gate 45a. Thus, both inputs 46a and 47 of the AND gate 45a simultaneously provide a signal to said AND gate, so that the said AND gate is switched to its conductive condition and produces a signal at its output 48a. The signal in the output 48a is also in the input 48a of the magnitude identification relays 15 and energizes the magnitude identification relay 71.

The energization of the magnitude identification relay 71 moves the armature 71A thereof to its position other than that shown in FIG. 2b so that the self-holding circuit of said relay is closed. The magnitude identification relays 72 and 73 cannot be energized because the AND gates 45b and 45c of the evaluator 14 are not supplied with signals to both their inputs simultaneously. The relay 70, which is energized upon the switching of the contact field by the closing of the cam-operated switch 42b, is deenergized as soon as said switch is opened again. When the armature 70A of the relay 70 breaks contact with the contact 75a, the self-holding circuit of said relay is opened and only the relay 71 remains in its self-holding circuit.

The magnitude identification relay 71 corresponds to group II, in which the magnitude may range from $660.00 to $749.99. When the self-holding circuit of the relay 71 is closed and said relay is energized, the diode network 81b is conductive. Three of the diodes of the diode network 81b are connected to the carriage position switches 91b, 92b and 93b of the accounting apparatus carriage position switches 17. These diodes are connected through said carriage position switches to the storage device control relays 82a, 82e and 82f, which correspond to the deductions or constants K1, K5 and K6, respectively, as noted in FIG. 1, the storage device control relays 82a to 82*l* corresponding to the deductions or constants K1 to K12, respectively.

The desired storage device control relays 82*a*, 82*e* and 82*f* are energized, however, only as the carriage of the accounting apparatus reaches the proper column positions. Thus, the storage device control relay 82*a*, corresponding to K1, is energized only when the carriage is in its column 2 position, the carriage position switches 91*a* having been operated by the carriage position relay 89*b* (FIG. 4). The carriage position relay 89*b* is energized by a stop or other suitable actuating mechanism which is set or positioned in the mechanical control bridge of the accounting apparatus for the row of switches 87*a*, 87*b*, 87*c* and 87*d*. The stop or actuating mechanism moves the armatures of the switches 87*a*, 87*b*, 87*c* and 87*d* so that the carriage position relay 89*b* is energized via the source 83 of positive potential, the switch 85, the switch 86*a*, the switch 87*a*, the switch 88*b*, said relay, and the source 84 of negative potential.

The switches 91 are closed and the storage device control relay 82*a*, corresponding to K1, is energized via the circuit 78, 42*c*, 73A, 72A, 71A, 75*b*, 79*b*, the first diode of the diode network 81*b*, the carriage position switch 91*b*, said storage device control relay 82*a*, the first diode of the diode network 94*a*, the control relay 95*a* and a source 96 of negative potential. The control relay 95*a* is thus energized simultaneously with the storage device control relay 82*a*, since the deduction or constant K1 is determined or calculated as a maximum deduction in the carriage position or column 2 whereby such maximum deduction is made from the gross income, the control relay 95*a* controlling the provision of the corresponding calculating pulse.

If the carriage of the accounting apparatus is then advanced to the position of the column 3, all the switches 87*a* to 87*d* and 88*a* to 88*h* are operated by control stops or actuating mechanisms of the mechanical control bridge of the accounting apparatus. The carriage position relay 89*c* (FIG. 4) is energized in the same manner as described for the energization of the carriage position relay 89*b*. The carriage position relay 89*c* is energized via the source 83 of positive potential, the switch 85, the switch 86*a*, the switch 87*a* in its position opposite that shown in FIG. 4, the switch 88*b* in its position opposite that shown in FIG. 4, said relay, and the source 84 of negative potential.

The switches 92 are closed by energization of the carriage positioning relay 89*c* and the storage device control relay 82*e*, corresponding to K5, is energized via the circuit 78, 42*c*, 73A, 72A, 71A, 75*b*, 79*b*, the second diode of the diode network 81*b*, the carriage position switch 92*b*, said storage device control relay 82*e*, the second diode of the diode network 94*b*, the control relay 95*b* and the source 96 of negative potential. The control relay 95*b* is thus energized simultaneously with the storage device control relay 82*e*, since the deduction or constant K5 is determined or calculated as a percentage of the gross salary in the carriage position or column 3.

If the carriage of the accounting apparatus is then advanced to the position of the column 4, all the switches 86*a* and 86*b* are operated by control stops or actuating mechanisms of the mechanical control bridge of the accounting apparatus. The carriage position relay 89*d* (FIG. 4) is energized, in the manner described for the carriage position relays 89*b* and 89*c*, via the source 83 of positive potential, the switch 85, the switch 86*a* in its position opposite that shown in FIG. 4, the switch 87*b*, the switch 88*c*, said relay, and the source 84 of negative potential.

The switches 93 are closed by energization of the carriage position relay 89*d* and the storage device control relay 82*f*, corresponding to K6, is energized via the circuit 78, 42*c*, 73A, 72A, 71A, 75*b*, 79*b*, the third diode of the diode network 81*b*, the carriage position switch 93*b*, said storage device control relay 82*f*, the third diode of the diode network 94*b*, the control relay 95*b* and the source 96 of negative potential. The control relay 95*b* is thus energized simultaneously with the storage device control relay 82*f*, since the deduction or constant K6 is determined or calculated as a percentage of the gross salary in the carriage position or column 4.

FIG. 5 is a schematic diagram of accounting apparatus including the computer circuit arrangement of the present invention. The accounting apparatus includes a keyboard 101, a transfer circuit 102, calculating and storage devices 104, a carriage 105 and a program control or mechanical control bridge 106, each of which may comprise any suitable known arrangement and each of which functions as hereinbefore described and is related and cooperates with the other components in the manner hereinbefore described. The circuit arrangement 103 of the present invention is utilized with the accounting apparatus in the manner shown in FIG. 5 and as hereinbefore described.

While the invention has been described by means of specific examples and in a specific embodiment, we do not wish to be limited thereto, for obvious modifications will occur to those skilled in the art without departing from the spirit and scope of the invention.

What we claim is:

1. In a circuit arrangement for accounting apparatus including keyboard means having a selected amount set therein, contact matrix means for identifying a selected magnitude of said selected amount, transfer means for transferring signals corresponding to said selected amount from said keyboard means to said contact matrix means, and calculating and storage means for calculating and storing said selected magnitude, a plurality of magnitude identification relays corresponding to selected magnitudes for actuating selected ones of said calculating and storage means and circuit means interconnecting said magnitude identification relays to permit only one of said magnitude identification relays to be energized at a time;

distributor means connected to said contact matrix means; and connecting means connecting said distributor means to said magnitude identification relays for energizing selected ones of said magnitude identification relays directly via said distributor means for determined amounts transferred to said contact matrix means and for energizing selected ones of said magnitude identification relays via said distributor means and said connecting means for determined other amounts transferred to said contact matrix means.

2. In a circuit arrangement as claimed in claim 1, wherein said connecting means comprises a plurality of AND gates.

3. In a circuit arrangement as claimed in claim 1, wherein said connecting means comprises a plurality of AND gates each comprising a circuit having a plurality of interconnected diodes.

4. In a circuit arrangement as claimed in claim 1 and further including a carriage, further comprising a plurality of storage device control relays for selecting said calculating and storage means, carriage position means comprising a plurality of carriage position switches connected to said control relays for selecting said calculating and storage means in dependence on said carriage position switches and coupling means connecting said magnitude identification relays to said carriage position switches.

5. In a circuit arrangement as claimed in claim 4, wherein said coupling means comprises a plurality of diode networks.

6. In a circuit arrangement as claimed in claim 4 and further including program control means, wherein said carriage position switches comprise a plurality of actuating switches positioned in operative proximity with and actuated by said program control means and carriage position circuit means interconnecting said carriage positioning switches and said actuating switches.

7. In a circuit arrangement as claimed in claim 6, wherein said carriage position switch means further comprise a plurality of carriage position relays connected by said circuit means to said carriage position switches and said actuating switches for operating the said carriage position switches.

8. In a circuit arrangement as claimed in claim 4, further comprising a plurality of control relays for providing commands and further coupling means connecting said control relays to said storage device control relays.

9. In a circuit arrangement as claimed in claim 8, wherein said further coupling means comprises a plurality of diode networks.

References Cited

UNITED STATES PATENTS

| | | | |
|---|---|---|---|
| 3,228,004 | 1/1966 | McGregor | 340—172.5 |
| 3,223,979 | 12/1965 | Dirks | 340—172.5 |
| 3,217,296 | 11/1965 | Bogert et al. | 340—147 |
| 3,208,046 | 9/1965 | Young | 340—172.5 |
| 3,197,738 | 7/1965 | Raser et al. | 340—172.5 |
| 3,109,925 | 11/1963 | Wood | 235—61.11 |
| 3,092,823 | 6/1963 | Martin et al. | 340—347 |
| 2,925,586 | 2/1960 | Levy | 340—174 |
| 2,912,511 | 11/1959 | McKim | 179—18 |

ROBERT C. BAILEY, *Primary Examiner.*

G. D. SHAW, *Assistant Examiner.*